United States Patent
Huang et al.

(10) Patent No.: US 10,898,859 B2
(45) Date of Patent: Jan. 26, 2021

(54) AUTOMATIC OPERATING DEVICE FOR HOLLOW FIBER MEMBRANE

(71) Applicant: Dongguan University of Technology, Guangdong (CN)

(72) Inventors: Simin Huang, Dongguan (CN); Kui He, Dongguan (CN); Wuzhi Yuan, Dongguan (CN); Minlin Yang, Dongguan (CN)

(73) Assignee: Dongguan University of Technology, Guangdong (CN)

( * ) Notice: Subject to any disclaimer, the term of this patent is extended or adjusted under 35 U.S.C. 154(b) by 0 days.

(21) Appl. No.: 16/242,682

(22) Filed: Jan. 8, 2019

(65) Prior Publication Data
US 2020/0047127 A1    Feb. 13, 2020

(30) Foreign Application Priority Data
Aug. 10, 2018   (CN) .......................... 2018 1 0908219

(51) Int. Cl.
| | |
|---|---|
| *B01D 63/00* | (2006.01) |
| *B01D 69/00* | (2006.01) |
| *B01D 63/02* | (2006.01) |
| *B01D 69/10* | (2006.01) |
| *B01D 69/08* | (2006.01) |

(52) U.S. Cl.
CPC ............ *B01D 63/022* (2013.01); *B01D 63/02* (2013.01); *B01D 63/021* (2013.01); *B01D 69/08* (2013.01); *B01D 69/10* (2013.01)

(58) Field of Classification Search
None
See application file for complete search history.

(56) References Cited

U.S. PATENT DOCUMENTS

| | | | |
|---|---|---|---|
| 2017/0182462 A1* | 6/2017 | Torichigai | ................. B31C 3/00 |
| 2017/0189856 A1* | 7/2017 | Ideguchi | .................. B32B 5/24 |

OTHER PUBLICATIONS

English machine translation of CN101450284 A; Jun. 10, 2009; Efficient Hollow Fiber Membrane Module Device and Method; Hou et al; 7 pages. (Year: 2009).*

* cited by examiner

*Primary Examiner* — Linda L Gray
(74) *Attorney, Agent, or Firm* — JCIPRNET

(57) ABSTRACT

An automatic operating device for hollow fiber membrane includes a first membrane fiber traction apparatus, a membrane fiber bracket member for fixing the membrane fiber, and a second fiber traction apparatus, which are disposed in sequence. The membrane fiber bracket member comprises a first membrane fiber bracket and a second membrane fiber bracket each having upper openings. The first membrane fiber traction apparatus, the first membrane fiber bracket, the second membrane fiber bracket, and the second membrane fiber traction apparatus are all provided with membrane fiber holes matched with the membrane fiber. The automatic operating device further comprises a membrane fiber grabbing mechanism, a first driving mechanism, a cutting mechanism and a glue-filling mechanism. The present invention can realize the automatic penetration of membrane fiber into the membrane fiber brackets and the traction apparatus, and realize formation of the membrane fiber in a regular arrangement.

18 Claims, 5 Drawing Sheets

AUTOMATIC OPERATING DEVICE FOR HOLLOW FIBER MEMBRANE

TECHNICAL FIELD

The present invention relates to a technical field of gas-liquid membrane separation, and in particular relates to an automatic operating device for hollow fiber membrane.

BACKGROUND

Membrane separation technology is widely used in desalination of seawater, water treatment, biomedical treatment and many other modern industrial technical fields. Membrane module is a key component in a variety of membrane separation industries, and its processing technology and related devices have important economic value. However, at present, the processing technology using hollow fiber membrane modules fails to achieve mechanization and such modules are not consistent in performance. With increasing use of the membrane separation technology, automation of the processing of the membrane module and better quality of the module itself are required.

An important reason why it is difficult to automate the processing of the membrane module is that the hollow fiber membrane made of organic material is not as rigid as ceramic membrane. A bending deformation will occur when the membrane suffers a relatively small force.

Chinese patent No. 104874292A discloses an anti-pollution, easy-to-clean hollow fiber membrane module and its manufacturing method thereof, which is mainly in a manual way and fails to realize the automation of the processing. Chinese patent CN101450284 discloses an efficient hollow fiber membrane module device and method, which realizes regular arrangement of fibers and prevents the membrane fibers from tangling during operation by a separation net disposed between the fibers, but it does not fulfill the requirement of automated processing. However, heating of the separation net increases the resistance during operation.

Therefore, to develop an automated technology and device for producing hollow fiber membrane module in regular arrangement becomes an urgent need in the field of membrane separation technology.

SUMMARY OF THE INVENTION

In order to overcome the deficiencies and shortcomings of the prior art that hollow fiber membrane fails to realize the automatic production of the manufacturing process, it is an object of the present invention to provide an automatic operating device for hollow fiber membrane. The automatic operating device for the hollow fiber membrane provided by the present invention can realize the automatic penetration of membrane fiber into a membrane fiber bracket and a traction apparatus, and realize formation of the membrane fiber in a regular arrangement, by the cooperation of the traction apparatus, a membrane fiber bracket member, a membrane fiber grabbing mechanism, a driving mechanism and the like. The whole process has fewer manual intervention and less consumables, and produces modules with higher quality, and it can be applied to the manufacturing and processing of various membrane separation modules.

In order to achieve the above objects, the present invention uses the following technical solutions:

An automatic operating device for hollow fiber membrane, comprises a first membrane fiber traction apparatus, a membrane fiber bracket member for fixing the membrane fiber, and a second fiber traction apparatus, which are disposed in sequence. The membrane fiber bracket member comprises a first membrane fiber bracket and a second membrane fiber bracket both having upper openings. The first membrane fiber traction apparatus, the first membrane fiber bracket, the second membrane fiber bracket, and the second membrane fiber traction apparatus are all provided with membrane fiber holes matched with the membrane fiber;

The automatic operating device further comprises a membrane fiber grabbing mechanism, a first driving mechanism for driving the membrane fiber grabbing mechanism, the second membrane fiber traction apparatus, the second membrane fiber bracket and the first membrane fiber bracket to be close to or away from each other, a cutting mechanism for cutting the membrane fiber and a glue-filling mechanism for glue-filling. The membrane fiber grabbing mechanism comprises a negative pressure providing device, and the negative pressure providing device is connected with a hollow member. The hollow member is matched with the membrane fiber hole and can pass through the membrane fiber hole.

The automatic operating device for the hollow fiber membrane provided by the present invention realizes automatic grabbing and traction of the membrane fiber by the following processes. First, the first driving mechanism drives the membrane fiber grabbing mechanism to move toward the second membrane fiber traction apparatus, so that the hollow member passes through the membrane fiber holes in sequence, and is in contact with the membrane fiber of the first membrane fiber traction apparatus. Then, after the membrane fiber is grabbed by using the negative pressure, the membrane fiber grabbing mechanism is driven away from the second membrane fiber traction apparatus, and then the membrane fiber is driven to pass through the membrane fiber bracket member and the second membrane fiber traction apparatus in sequence. Then the first membrane fiber bracket and the second membrane fiber bracket are driven to be close to or away from each other to obtain a suitable length of the membrane fiber. The glue-filling mechanism is used to fill the upper openings of the membrane fiber bracket member and the membrane fiber holes with glue, so that the membrane fiber is fixed with the brackets and the membrane fiber is fixed with the membrane fiber. The membrane fiber is cut by the cutting mechanism. Therefore, an automatic arrangement and fixing of the membrane fiber are achieved.

Preferably, the negative pressure providing device comprises a hermetic cavity and the hermetic cavity is provided with a vacuum pump.

The provision of the vacuum pump enables the hermetic cavity to be switched between the normal pressure state and the negative pressure state to realize grabbing of the hollow member.

Preferably, the hollow member is a capillary tube.

The capillary tube can better realize grabbing the membrane fiber.

The material and diameter (inner diameter) of the capillary tube can be selected according to actual production needs.

Preferably, the capillary tube is made of metal; the capillary tube has a diameter of 1 mm to 2 mm.

In order to realize a better hermetic connection between the hollow member and the negative pressure providing device, these two may be connected by some connection methods commonly used in the prior art.

Preferably, the hollow member is connected to the negative pressure providing device in interference fit and sealed with glue.

The number and arrangement of the hollow member can be selected according to actual needs.

Preferably, the number of the hollow member is plural and the hollow members are disposed in a single row or in multiple rows.

Preferably, the first driving mechanism comprises a first roller, a first guide rail and a controller. The first roller is disposed under the membrane fiber grabbing mechanism, the second membrane fiber traction apparatus, the second membrane fiber bracket and the first membrane fiber bracket. The first guide rail is disposed between the membrane fiber grabbing mechanism, the second membrane fiber traction apparatus, the second membrane fiber bracket and the first membrane fiber bracket. The controller drives the first roller to move along the first guide rail.

The cooperation between the roller, the guide rail and the controller can better realize grabbing the membrane fiber by the membrane fiber grabbing mechanism.

Members conventionally used in the art for cutting the membrane fiber and members conventionally used in the art for glue-filling can be used in the present invention.

Preferably, the cutting mechanism is a membrane fiber cutter.

More preferably, the membrane fiber cutter is a laser cutter.

Preferably, the glue-filling mechanism is a glue-filling machine.

More preferably, the glue-filling machine comprises a glue mixer, a peristaltic pump and a delivery tube, which are connected in sequence.

The delivery tube can transport the glue to the membrane fiber bracket member and the membrane fiber to realize the fixing between the membrane fiber and the membrane fiber bracket member, and the fixing between the membrane fibers.

The present invention also claims another automatic operating device for hollow fiber membrane with similar structure, comprises a first membrane fiber traction apparatus, a membrane fiber bracket member for fixing the membrane fiber, and a second membrane fiber traction apparatus, which are disposed in sequence. The membrane fiber bracket member comprises a first membrane fiber bracket and a second membrane fiber bracket each with an openable upper part. The first membrane fiber traction apparatus, the first membrane fiber bracket, the second membrane fiber bracket, and the second membrane fiber traction apparatus are all provided with membrane fiber holes matched with the membrane fiber.

The automatic operating device further comprises a membrane fiber grabbing mechanism, a first driving mechanism for driving the first membrane fiber bracket, the second membrane fiber bracket, the membrane fiber grabbing mechanism and the second membrane fiber traction apparatus to be close to or away from each other, a cutting mechanism for cutting the membrane fiber, a glue-filling mechanism for glue-filling and a second driving mechanism for driving the first membrane fiber traction apparatus to be close to or away from the membrane fiber bracket member. When the first membrane fiber traction apparatus, the membrane fiber bracket member and the second membrane fiber traction apparatus are in contact, the membrane fiber hole forms a membrane fiber channel with an open end surface. The membrane fiber grabbing mechanism comprises a negative pressure providing device, and the negative pressure providing device is provided with a suction port, and the suction port is matched with the membrane fiber channel.

The automatic operating device for the hollow fiber membrane provided by the present invention realizes automatic grabbing and traction of the membrane fiber by the following processes. First, under the driving action of the first driving mechanism and the second driving mechanism, the first membrane fiber traction apparatus, the membrane fiber bracket member, the second membrane fiber traction apparatus and the membrane fiber grabbing mechanism are in contact with each other, and a complete membrane fiber channel is formed. Using the suction port, the membrane fiber is grabbed under a negative pressure condition. The membrane fiber grabbing mechanism is driven away from the second membrane fiber traction apparatus, so that the membrane fiber passes through the membrane fiber bracket member and the second membrane fiber traction apparatus in sequence. Then, the driving mechanisms are used to drive each component to separate from each other, so that the membrane fiber is maintained at the desired length. The glue-filling mechanism is used to fill the upper openings of the membrane fiber bracket member and the membrane fiber holes with glue, so that the membrane fiber is fixed with the brackets and the membrane fiber is fixed with the membrane fiber. The membrane fiber is cut by the cutting mechanism. Therefore, an automatic arrangement and fixing of the membrane fiber are achieved.

Preferably, the first membrane fiber bracket and the second membrane fiber bracket each comprises an upper bracket and a lower bracket nested vertically; the membrane fiber hole is disposed on the lower bracket.

The design of the vertical nest can better realize opening and closing of the upper part of the membrane fiber bracket.

More preferably, the upper bracket is further provided with a membrane fiber hole, and the membrane fiber hole on the upper bracket overlaps the membrane fiber hole on the lower bracket.

Preferably, the negative pressure providing device comprises a hermetic cavity and the hermetic cavity is provided with a vacuum pump.

The provision of the vacuum pump enables the hermetic cavity to be switched between the normal pressure state and the negative pressure state to realize grabbing the hollow member.

The number and arrangement of the suction port can be selected according to actual needs.

Preferably, the number of the suction port is plural and the suction ports are disposed in a single row or in multiple rows.

Preferably, the first driving mechanism comprises a first roller, a first guide rail and a controller. The first roller is disposed under the membrane fiber grabbing mechanism, the second membrane fiber traction apparatus, the second membrane fiber bracket and the first membrane fiber bracket. The first guide rail is disposed between the membrane fiber grabbing mechanism, the second membrane fiber traction apparatus, the second membrane fiber bracket and the first membrane fiber bracket. The controller drives the first roller to move along the first guide rail.

The cooperation between the roller, the guide rail and the controller can better realize grabbing the membrane fiber by the membrane fiber grabbing mechanism.

Members conventionally used in the art for cutting membrane fiber and members conventionally used in the art for glue-filling can be used in the present invention.

Preferably, the cutting mechanism is a membrane fiber cutter.

More preferably, the membrane fiber cutter is a laser cutter.

Preferably, the glue-filling mechanism is a glue-filling machine.

More preferably, the glue-filling machine comprises a glue mixer, a peristaltic pump and a delivery tube, which are connected in sequence.

The delivery tube can transport the glue to the membrane fiber bracket member and the membrane fiber to realize the fixing between the membrane fiber and the membrane fiber bracket member, and the fixing between the membrane fibers.

Preferably, the second driving mechanism comprises a second roller, a second guide rail and a controller. The second roller is disposed under the first membrane fiber traction apparatus. The second guide rail is disposed between the first membrane fiber traction apparatus and the membrane fiber bracket member. The controller drives the second roller to move along the second guide rail.

The arrangement of the roller, the guide rail and the controller can better realize the formation of the membrane fiber channel and obtain a suitable length of the membrane fiber.

Compared with the prior art, the present invention has the following beneficial effects:

The automatic operating device for the hollow fiber membrane provided by the present invention can realize the automatic penetration of the membrane fiber into the membrane fiber bracket and the traction apparatus, and realize formation of the membrane fiber in a regular arrangement, by the cooperation of the traction apparatus, the membrane fiber bracket member, the membrane fiber grabbing mechanism, the driving mechanisms and the like. The whole process has fewer manual intervention and less consumables, and produces modules with higher quality, and it can be applied to the manufacturing of various membrane separation modules.

Wherein, 1 represents a first membrane fiber traction apparatus; 2 represents a membrane fiber bracket member; 201 represents a first membrane fiber bracket; 202 represents a second membrane fiber bracket; 3 represents a second membrane fiber traction apparatus; 4 represents a membrane fiber grabbing mechanism; 401 represents a hermetic cavity; 402 represents a suction port; 403 represents a hollow member; 404 represents a vacuum pump; 5 represents a first driving mechanism; 501 represents a first roller; 502 represents a first guide rail; 6 represents a cutting mechanism; 7 represents a glue-filling mechanism; 701 represents a glue mixer; 702 represents a peristaltic pump; 703 represents a delivery tube; 8 represents a second driving mechanism; 801 represents a second roller; 802 represents a second guide rail; 9 represents membrane fiber.

DESCRIPTION OF THE EMBODIMENTS

The present invention will be further described in detail below with reference to the accompanying drawings and specific embodiments of the invention, in order to make objects, technical solutions and advantages of the present invention clear. It is understood that the specific embodiments described herein are merely illustrative of the invention and are not intended to limit the invention. Further, the technical features involved in the various embodiments of the present invention described below may be combined with each other as long as they do not constitute a conflict with each other.

It should be noted that when a component is referred to as being "disposed in" or "provided on" another component, it can be either directly on the other component or a centered component between these two may exist. When a component is considered to be "connected" to another component, it can be directly connected to the other component or a centered component between these two may simultaneously exist.

Embodiment 1

Figure 1:
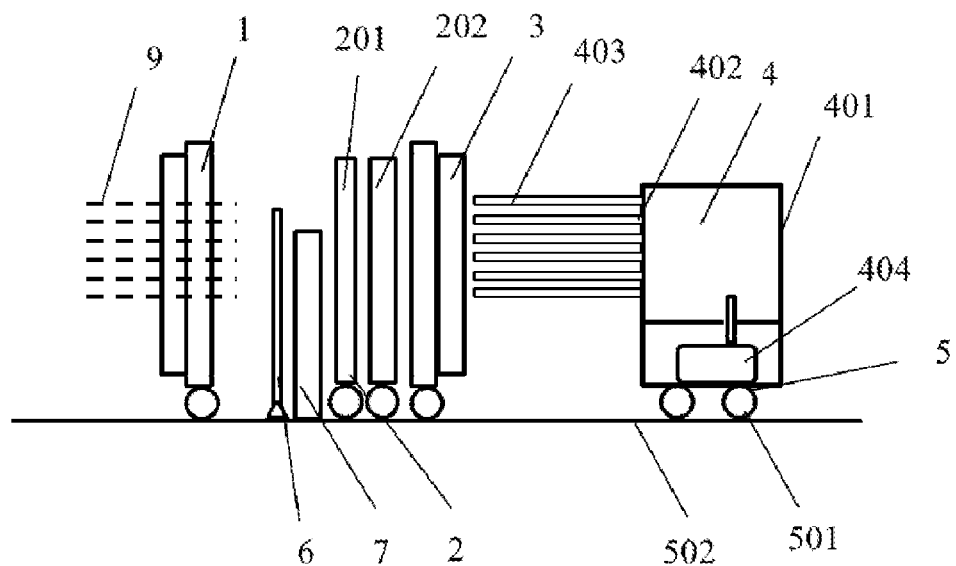
FIG. 1 is a structural schematic view of an automatic operating device for hollow fiber membrane provided in Embodiment 1.

As shown in FIG. 1, the present embodiment provides an automatic operating device for hollow fiber membrane, comprising a first membrane fiber traction apparatus 1, a membrane fiber bracket member 2 for fixing the membrane fiber, and a second fiber traction apparatus 3, which are disposed in sequence. The membrane fiber bracket member 2 comprises a first membrane fiber bracket 201 and a second membrane fiber bracket 202 disposed in parallel and each having upper openings. The first membrane fiber traction apparatus 1, the first membrane fiber bracket 201, the second membrane fiber bracket 202, and the second membrane fiber traction apparatus 3 are all provided with membrane fiber holes matched with the membrane fiber. The automatic operating device further comprises a membrane fiber grabbing mechanism 4, a first driving mechanism 5 for driving the membrane fiber grabbing mechanism 4, the second membrane fiber traction apparatus 3, the second membrane fiber bracket 202 and the first membrane fiber bracket 201 to be close to or away from each other, a cutting mechanism 6 for cutting the membrane fiber and a glue-filling mechanism 7 for glue-filling. The membrane fiber grabbing mechanism 4 comprises a negative pressure providing device and a hollow member 403. Specifically, the negative pressure providing device includes a hermetic cavity 401, and a vacuum pump 404 disposed in the hermetic cavity 401. A suction port 402 is defined in a sidewall of the hermetic cavity 401 and the suction port 402 is connected with the hollow member 403; the hollow member is matched with the membrane fiber hole and can pass through the membrane fiber hole.

Figure 2:
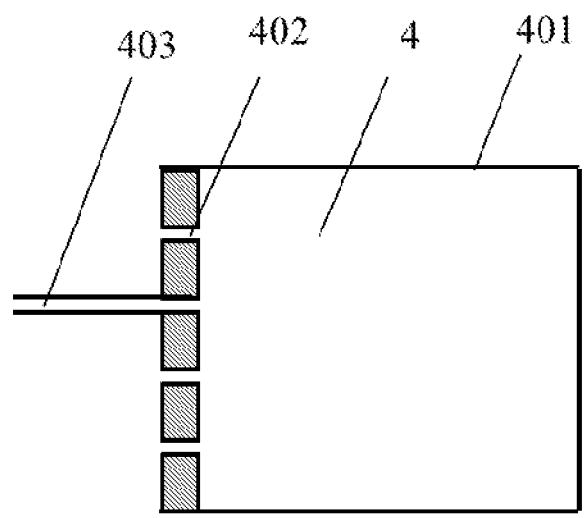
FIG. 2 is a structural schematic view of a hermetic cavity in Embodiment 1.

As shown in FIG. 2, the hollow member 403 can be selected according to the membrane fiber and the membrane fiber hole matched with the membrane fiber, and achieves a good connection with the hermetic cavity. In the present embodiment, the hollow member 403 is a capillary tube, and the capillary tube is connected to the hermetic cavity 401 in interference fit and sealed with glue. In order to realize better grabbing, the capillary tube is made of metal and its diameter (inner diameter) is 1 mm to 2 mm.

Figure 3:
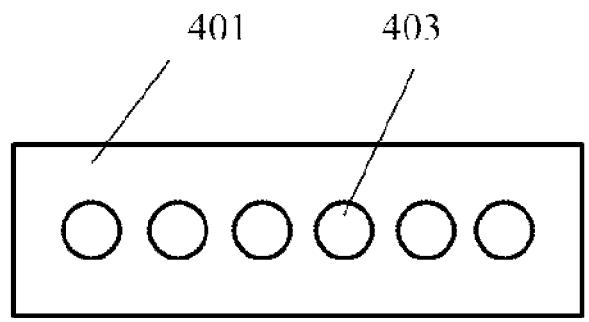
FIG. 3 is a structural schematic view of single-row capillary tubes in Embodiment 1.
Figure 5:
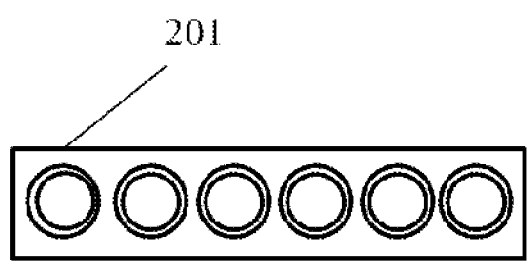
FIG. 5 is a structural schematic view of a single-row structured membrane fiber bracket member in Embodiment 1.
Figure 6:
FIG. 6 is a structural schematic view of another single-row structured membrane fiber bracket member in Embodiment 1.

According to actual needs, the number of the capillary tube may be one or plural, and in the present embodiment, the capillary tube is disposed in two arrangement forms:

As shown in FIG. 3, the capillary tubes are disposed in a single row at equal intervals; and correspondingly, the membrane fiber holes on the membrane fiber bracket member also are matched with the number and position of the capillary tubes. FIG. 5 and FIG. 6 are structural schematic views of two types of membrane fiber bracket members. Wherein, as shown in FIG. 5, the membrane fiber bracket member comprises the first membrane fiber bracket 201 and the second membrane fiber bracket 202 disposed in parallel, and the first membrane fiber bracket 201 and the second membrane fiber bracket 202 are both hollow and have square shaped cavity with an open upper part, and corresponding membrane fiber holes are disposed thereon. Structure of another membrane fiber bracket member is as shown in FIG. 6. The first membrane fiber bracket 201 and the second membrane fiber bracket 202 are each provided with a hollow groove, and the membrane fiber holes are disposed in the groove to form an equidistant arrangement.

Figure 4:
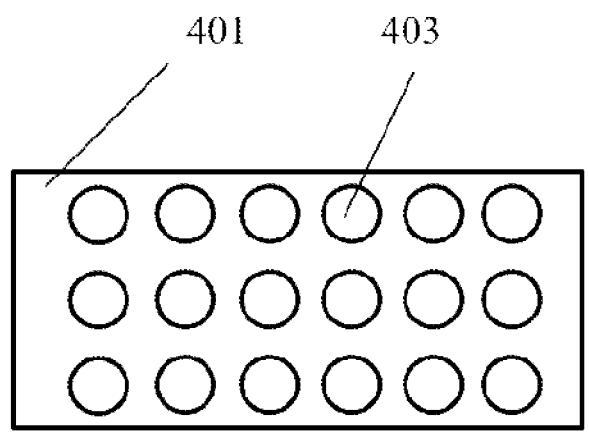
FIG. 4 is a structural schematic view of multi-row capillary tubes in Embodiment 1.
Figure 7:
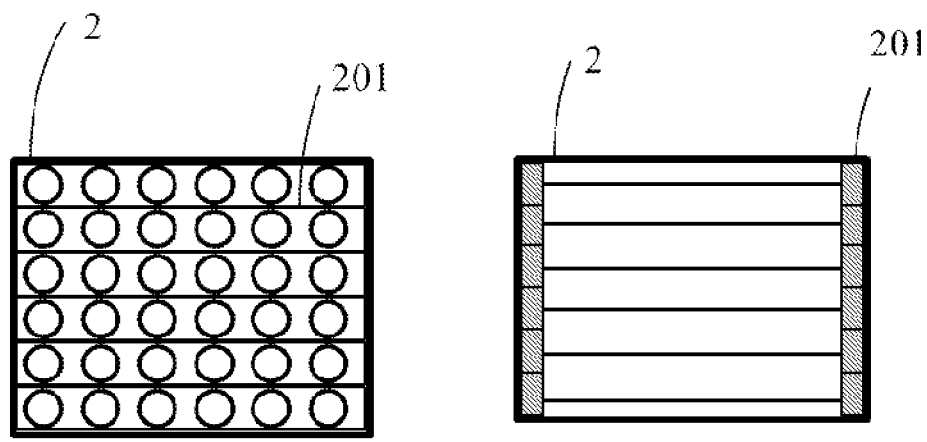
FIG. 7 is a structural schematic view of a multi-row structured membrane fiber bracket member in Embodiment 1.

As shown in FIG. 4, the capillary tubes are disposed in multiple rows at equal intervals, and correspondingly, the membrane fiber holes on the membrane fiber bracket member are also matched with the number and position of the capillary tubes (as shown in FIG. 7).

In the present embodiment, the first driving mechanism 5 comprises a first roller 501, a first guide rail 502 and a controller. The first roller 501 is disposed under the hermetic cavity 401, the second membrane fiber traction apparatus 3, the second membrane fiber bracket 202 and the first membrane fiber bracket 201. The first guide rail 502 is disposed between the hermetic cavity 401, the second membrane fiber traction apparatus 3, the second membrane fiber bracket 202 and the first membrane fiber bracket 201. The controller drives the first roller 501 to move along the first guide rail 502.

The cooperation between the roller, the guide rail and the controller can better enable the second membrane fiber traction apparatus 3, the hermetic cavity 401, the second membrane fiber bracket 202 and the first membrane fiber bracket 201 to be close to or away from each other, and can realize grabbing the membrane fiber by the membrane fiber grabbing mechanism.

In the present embodiment, the cutting mechanism 6 is a membrane fiber cutter, and specifically the membrane fiber cutter is a laser cutter.

Figure 8:
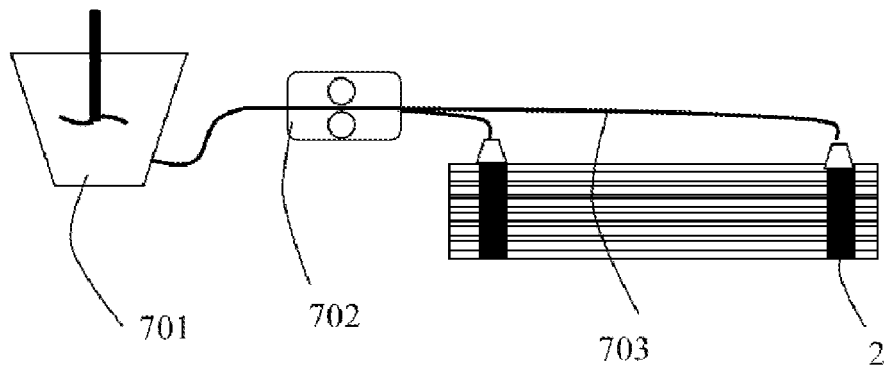
FIG. 8 is a structural schematic view of a glue-filling machine in Embodiment 1.

In the present embodiment, the glue-filling mechanism 7 is a glue-filling machine. As shown in FIG. 8, the glue filling machine comprises a glue mixer 701, a peristaltic pump 702, and a delivery tube 703, which are sequentially connected. The delivery tube 703 can transport the glue to the membrane fiber bracket member and the membrane fiber to realize the fixing between the membrane fiber and the membrane fiber bracket member, and the fixing between the membrane fibers.

The automatic operating device for the hollow fiber membrane provided by the present invention can automatically grab and tract the membrane fiber to realize automatic regular arrangement, and the specific implementation processes are as follows: first, the controller of the first driving mechanism drives the hermetic cavity to move along the guide rail toward the second membrane fiber traction apparatus, so that the capillary tube passes through the membrane fiber holes in sequence, and is in contact with the membrane fiber on the first membrane fiber traction apparatus. Then, the membrane fiber is grabbed by using the negative pressure provided by the vacuum pump, then the controller drives the hermetic cavity to be away from the second membrane fiber traction apparatus, and thus drives the membrane fiber to pass through the membrane fiber bracket member and the second membrane fiber traction apparatus in sequence. Then the first membrane fiber bracket and the second membrane fiber bracket are driven to be close to or away from each other to obtain a suitable length of the membrane fiber. The glue-filling mechanism is used to fill the upper openings of the membrane fiber bracket member and the membrane fiber holes with glue, so that the membrane fiber is fixed with the brackets and the membrane fiber is fixed with the membrane fiber. The cutting mechanism is used to cut the membrane fiber, so as to realize the automatic arrangement and fixing of the membrane fiber.

Embodiment 2

Figure 9:
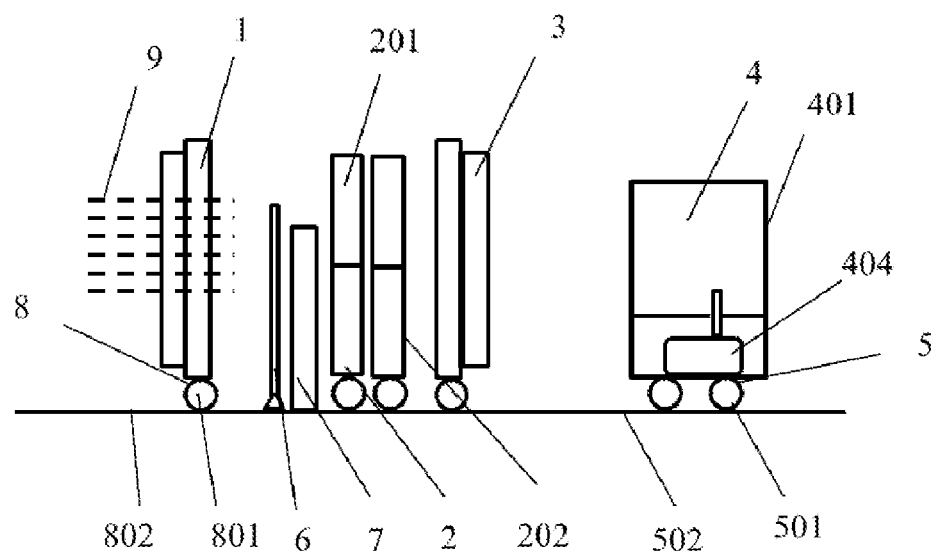
FIG. 9 is a structural schematic view of an automatic operation device for hollow fiber membrane provided in Embodiment 2.
Figure 10:
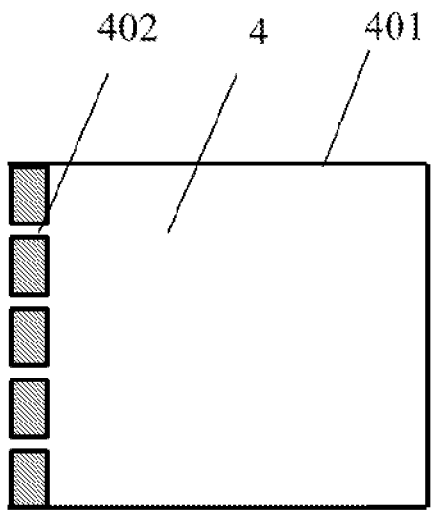
FIG. 10 is a structural schematic view of a hermetic cavity in Embodiment 2.

An automatic operating device for hollow fiber membrane, as shown in FIG. 9, comprising a first membrane fiber traction apparatus 1, a membrane fiber bracket member 2 for fixing the membrane fiber, and a second fiber traction apparatus 3, which are disposed in sequence. The membrane fiber bracket member 2 comprises a first membrane fiber bracket 201 and a second membrane fiber bracket 202 each with an openable upper part. The first membrane fiber traction apparatus 1, the first membrane fiber bracket 201, the second membrane fiber bracket 202, and the second membrane fiber traction apparatus 3 are all provided with membrane fiber holes matched with the membrane fiber. The automatic operating device further comprises a membrane fiber grabbing mechanism 4, a first driving mechanism 5 for driving the membrane fiber grabbing mechanism 4, the second membrane fiber traction apparatus 3, the second membrane fiber bracket 202 and the first membrane fiber bracket 201 to be close to or away from each other, a cutting mechanism 6 for cutting the membrane fiber and a glue-filling mechanism 7 for glue-filling, and a second driving mechanism 8 for driving the first membrane fiber traction apparatus 1 to be closed to or away from the membrane fiber bracket member 2. When the first membrane fiber traction apparatus 1, the membrane fiber bracket member 2 and the second membrane fiber traction apparatus 3 are in contact, the membrane fiber hole forms a membrane fiber channel with an open end surface; the membrane fiber grabbing mechanism 4 comprises a negative pressure providing device and a suction port 402. Specifically, as shown in FIG. 10, the negative pressure providing device comprises a hermetic cavity 401, and a vacuum pump 404 disposed in the hermetic cavity 401; a sidewall of the hermetic cavity 401 is provided with a suction port 402, and the suction port 402 is matched with the membrane fiber channel.

The suction port 402 can be selected according to the membrane fiber and the membrane fiber holes matched with the membrane fiber.

The number of the suction ports 402 may be one or plural according to actual needs. In the present embodiment, two arrangement forms of the suction ports 402 are provided: disposed in a single row at equal intervals and disposed in multiple rows at equal intervals. Correspondingly, the membrane fiber holes on the membrane fiber bracket member 2 are also matched with the number and position of the suction ports 402.

Figure 11:
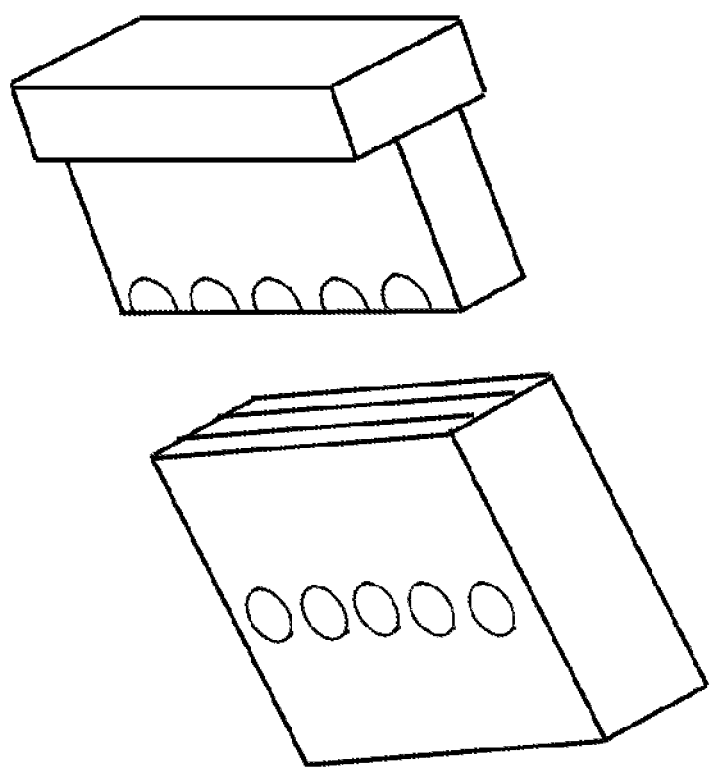
FIG. 11 is a schematic structural view of a single-row structured first membrane fiber bracket in Embodiment 2.

FIG. 11 is a structural schematic view of the first membrane fiber bracket 201. Indeed, the structure of the second membrane fiber bracket 202 is the same as that of the first membrane fiber bracket 201. The first membrane fiber bracket 201 comprises an upper bracket and a lower bracket which are nested vertically. The upper bracket and the lower bracket are respectively provided with membrane fiber hole. When these two are stacked, the membrane fiber holes overlap each other, and when they are in close contact with other members, a membrane fiber channel with an open end surface is formed.

In the present embodiment, the first driving mechanism 5 comprises a first roller 501, a first guide rail 502 and a controller. The first roller 501 is disposed under the hermetic cavity 401, the second membrane fiber traction apparatus 3, the second membrane fiber bracket 202 and the first membrane fiber bracket 201. The first guide rail 502 is disposed between the hermetic cavity 401, the second membrane fiber traction apparatus 3, the second membrane fiber bracket 202 and the first membrane fiber bracket 201. The controller drives the first roller 501 to move along the first guide rail 502.

The cooperation between the roller, the guide rail and the controller can better enable the second membrane fiber traction apparatus 3, the hermetic cavity 401, the second membrane fiber bracket 202 and the first membrane fiber bracket 201 to be close to or away from each other, and can realize grabbing the membrane fiber by the membrane fiber grabbing mechanism.

In the present embodiment, the cutting mechanism 6 is a membrane fiber cutter, and specifically a laser cutter.

In the present embodiment, the glue-filling mechanism 7 is a glue-filling machine. As shown in FIG. 8, the glue-filling machine comprises a glue mixer 701, a peristaltic pump 702, and a delivery tube 703, which are sequentially connected.

In the present embodiment, the second driving mechanism 8 comprises a second roller 801, a second guide rail 802 and a controller. The second roller 801 is disposed under the first membrane fiber traction apparatus 1. The second guide rail 802 is disposed between the first membrane fiber traction apparatus 1 and the membrane fiber bracket member 2. The controller drives the second roller 801 to move along the second guide rail 802.

The automatic operating device for the hollow fiber membrane provided by the present invention can automatically grab and tract the membrane fiber to realize automatic regular arrangement, and the specific implementation processes are as follows: first, the controllers of the first driving mechanism and the second driving mechanism drive the hermetic cavity, the membrane fiber traction apparatus and the membrane fiber bracket member to move along the guide rail to contact each other and so that the membrane fiber holes form the membrane fiber channel with openings on both ends. The suction port is firstly attached to the membrane fiber channel at one end, and then the vacuum pump is used to provide a negative pressure, so that the negative pressure is formed in the membrane channel for grabbing the membrane fiber. Then, after the controllers are used to drive each components to be away from each other to maintain a desired length of the membrane fiber, the upper bracket is removed, so that the lower bracket is opened. The glue-filling mechanism is used to fill the upper openings of the membrane fiber bracket member and the membrane fiber holes with glue, so that the membrane fiber is fixed with the brackets and the membrane fiber is fixed with the membrane fiber. The cutting mechanism is used to cut the membrane fiber, so as to realize the automatic arrangement and fixing of the membrane fiber.

The automatic operating device for the hollow fiber membrane provided by the present invention can realize the automatic penetration of membrane fiber into the membrane fiber brackets and the traction apparatus, and realize formation of the membrane fiber in a regular arrangement, by the cooperation of the traction apparatus, the membrane fiber bracket member, the membrane fiber grabbing mechanism, the driving mechanisms and the like. The whole process has fewer manual intervention and less consumables, and produces modules with higher quality, and it can be applied to the manufacturing of various membrane separation modules.

The above disclosure is only the preferred embodiments of the present invention, and the scope of the present invention is not limited thereto, and thus equivalent changes made in the claims of the present invention are still within the scope of the present invention.

What is claimed:

1. An automatic operating device for hollow fiber membrane, the automatic operating device comprising a first membrane fiber traction apparatus, a membrane fiber bracket member for fixing membrane fibers, and a second membrane fiber traction apparatus, which are disposed in sequence; wherein the membrane fiber bracket member comprises a first membrane fiber bracket and a second membrane fiber bracket (202) both having upper openings; the first membrane fiber traction apparatus, the first membrane fiber bracket, the second membrane fiber bracket, and the second membrane fiber traction apparatus are all provided with membrane fiber holes matched with the membrane fibers;

the automatic operating device further comprises a membrane fiber grabbing mechanism, a first driving mechanism for driving the membrane fiber grabbing mechanism, the second membrane fiber traction apparatus, the second membrane fiber bracket and the first membrane fiber bracket to be close to or away from each other, a cutting mechanism for cutting the membrane fibers and a glue-filling mechanism for glue-filling; the membrane fiber grabbing mechanism comprises a negative pressure providing device, and the negative pressure providing device is connected with a hollow member; the hollow member is matched with the membrane fiber holes of the first membrane fiber traction apparatus, the first membrane fiber bracket, the second membrane fiber bracket and the second membrane fiber traction apparatus and can pass therethrough.

2. The automatic operating device according to claim 1, wherein the negative pressure providing device comprises a hermetic cavity and the hermetic cavity is provided with a vacuum pump inside.

3. The automatic operating device according to claim 1, wherein the hollow member is a capillary tube.

4. The automatic operating device for hollow fiber membrane according to claim 3, wherein the capillary tube is made of metal; the capillary tube has a diameter of 1 mm to 2 mm.

5. The automatic operating device for hollow fiber membrane according to claim 4, wherein the hollow member is connected to the negative pressure providing device in interference fit and sealed with glue for hermetic connection.

6. The automatic operating device according to claim 1, wherein the number of the hollow member is plural and the hollow members are disposed in a single row or in multiple rows.

7. The automatic operating device according to claim 1, wherein the first driving mechanism comprises a first roller, a first guide rail and a controller, the first roller is disposed under the membrane fiber grabbing mechanism, the second membrane fiber traction apparatus, the second membrane fiber bracket and the first membrane fiber bracket; the first guide rail is disposed between the membrane fiber grabbing mechanism, the second membrane fiber traction apparatus, the second membrane fiber bracket and the first membrane fiber bracket; and the controller drives the first roller (501) to move along the first guide rail.

8. The automatic operating device according to claim 1, wherein the cutting mechanism is a membrane fiber cutter.

9. The automatic operating device for hollow fiber membrane according to claim 1, wherein the glue-filling mechanism is a glue-filling machine.

10. An automatic operating device for hollow fiber membrane, the automatic operating device comprising a first membrane fiber traction apparatus, a membrane fiber bracket member for fixing membrane fibers, and a second membrane fiber traction apparatus, which are disposed in sequence; wherein the membrane fiber bracket member comprises a first membrane fiber bracket and a second membrane fiber bracket each with an openable upper part; the first membrane fiber traction apparatus, the first membrane fiber bracket, the second membrane fiber bracket (202), and the second membrane fiber traction apparatus are all provided with first membrane fiber holes matched with the membrane fibers;

the automatic operating device further comprises a membrane fiber grabbing mechanism, a first driving mechanism for driving the membrane fiber grabbing mechanism, the second membrane fiber traction apparatus, the second membrane fiber bracket and the first membrane fiber bracket to be close to or away from each other, a cutting mechanism for cutting the membrane fibers, a glue-filling mechanism for glue-filling, and a second driving mechanism for driving the first membrane fiber traction apparatus to be closed to or away from the membrane fiber bracket member; and when the first membrane fiber traction apparatus, the membrane fiber bracket member and the second membrane fiber traction apparatus are in contact, the first membrane fiber holes of the first membrane fiber traction apparatus, the first membrane fiber bracket, the second membrane fiber bracket and the second membrane fiber traction apparatus form a membrane fiber channel with an open end surface; the membrane fiber grabbing mechanism comprises a negative pressure providing device, the negative pressure providing device is provided with a suction port and the suction port is matched with the membrane fiber channel.

11. The automatic operating device according to claim 10, wherein the first membrane fiber bracket and the second membrane fiber bracket each comprise an upper bracket and a lower bracket nested vertically; the first membrane fiber holes of the first membrane fiber bracket and the second membrane fiber bracket are disposed on the lower bracket.

12. The automatic operating device according to claim 11, wherein the upper bracket is further provided with second membrane fiber holes, and the second membrane fiber holes on the upper bracket overlap the first membrane fiber holes on the lower bracket.

13. The automatic operating device according to claim 10, wherein the negative pressure providing device comprises a hermetic cavity and the hermetic cavity is provided with a vacuum pump.

14. The automatic operating device according to claim 10, wherein the number of the suction port is plural and the suction ports are disposed in a single row or in multiple rows.

15. The automatic operating device according to claim 10, wherein the first driving mechanism comprises a first roller, a first guide rail and a controller, the first roller is disposed under the membrane fiber grabbing mechanism, the second membrane fiber traction apparatus, the second membrane fiber bracket and the first membrane fiber bracket; the first guide rail is disposed between the membrane fiber grabbing mechanism, the second membrane fiber traction apparatus, the second membrane fiber bracket and the first membrane fiber bracket; and the controller drives the first roller to move along the first guide rail.

16. The automatic operating device according to claim 10, wherein the cutting mechanism is a membrane fiber cutter.

17. The automatic operating device for hollow fiber membrane according to claim 10, wherein the glue-filling mechanism is a glue-filling machine.

18. The automatic operating device for hollow fiber membrane according to claim 10, wherein the second driving mechanism comprises a second roller, a second guide rail and a controller, the second roller is disposed under the first membrane fiber traction apparatus; the second guide rail is disposed between the first membrane fiber traction apparatus and the membrane fiber bracket member; and the controller drives the second roller to move along the second guide rail.

* * * * *